(12) United States Patent
Denavit

(10) Patent No.: US 10,137,653 B2
(45) Date of Patent: Nov. 27, 2018

(54) METHOD AND DEVICE FOR MANUFACTURING A GREEN TIRE

(71) Applicants: COMPAGNIE GENERALE DES ETABLISSEMENTS MICHELIN, Clermont-Ferrand (FR); MICHELIN RECHERCHE ET TECHNIQUE, S.A., Granges-Paccot (CH)

(72) Inventor: Franck Denavit, Clermont-ferrand (FR)

(73) Assignees: Compagnie Generale Des Etablissements Michelin, Clermont-Ferrand (FR); Michelin Recherche Et Technique, S.A., Granges-Paccot (CH)

( * ) Notice: Subject to any disclaimer, the term of this patent is extended or adjusted under 35 U.S.C. 154(b) by 106 days.

(21) Appl. No.: 14/651,883

(22) PCT Filed: Dec. 13, 2013

(86) PCT No.: PCT/EP2013/076512
§ 371 (c)(1),
(2) Date: Jun. 12, 2015

(87) PCT Pub. No.: WO2014/090983
PCT Pub. Date: Jun. 19, 2014

(65) Prior Publication Data
US 2015/0328853 A1    Nov. 19, 2015

(30) Foreign Application Priority Data
Dec. 13, 2012    (FR) ..................... 12 61989

(51) Int. Cl.
*B29D 30/30* (2006.01)
*B29D 30/00* (2006.01)
(Continued)

(52) U.S. Cl.
CPC ......... *B29D 30/30* (2013.01); *B29D 30/0016* (2013.01); *B29D 30/28* (2013.01);
(Continued)

(58) Field of Classification Search
CPC .... B29D 30/16; B29D 30/1607; B29D 30/30; B29D 30/3007; B29D 30/44;
(Continued)

(56) References Cited

U.S. PATENT DOCUMENTS 5,935,377 A    8/1999  Sergel et al.
6,355,126 B1 *  3/2002  Ogawa ............... B29D 30/1657
                                                156/117
(Continued)

FOREIGN PATENT DOCUMENTS

EP    1867467    12/2007
FR    1587096    3/1970
(Continued)

OTHER PUBLICATIONS

Machine generated English language translation of SU 1072366 (original document dated Jan. 1992).*
(Continued)

*Primary Examiner* — Martin K Rogers
(74) *Attorney, Agent, or Firm* — Dickinson Wright PLLC

(57) ABSTRACT

Method for manufacturing a green tire by winding a carcass reinforcement ply onto a tire-building drum on which a number of profiled elements are axially spaced apart one from one another and have a given thickness of which the meridian line has a curved profile are laid, wherein:
the front edge of the carcass reinforcement ply is grasped with the aid of a transport device having a chassis that supports a transverse row of ply gripping pads,
the carcass reinforcement ply is transferred between a supply station and drum,
(Continued)

the front edge of said ply is laid on the tire-building drum, said transport device is withdrawn, an applicator roller having a deformable profile is applied to the front edge of said ply and pressure is exerted in the radial direction across the width of said ply, and said drum is made to rotate. At least one of the gripping pads mounted in a movable manner with respect to the adjacent pads between a position in which all of the pads are located in a single plane and a second position in which at least said pad is vertically offset with respect to the adjacent pads to adapt the profile of said transverse row of pads to the curved profile of the meridian line of said second laying surface.

8 Claims, 4 Drawing Sheets

(51) Int. Cl.
  *B29D 30/28* (2006.01)
  *B65H 19/28* (2006.01)
  *B29D 30/44* (2006.01)

(52) U.S. Cl.
  CPC ........ *B29D 30/3007* (2013.01); *B65H 19/28* (2013.01); *B29D 2030/3064* (2013.01); *B29D 2030/4493* (2013.01)

(58) Field of Classification Search
  CPC ...... B29D 2030/0038; B29D 2030/082; B29D 2030/1692; B29D 2030/2671; B29D 2030/2678; B29D 2030/2685; B29D 2030/2692; B29D 2030/425; B29D 2030/426; B29D 2030/4406; B29D 2030/4412; B29D 2030/4418; B29D 2030/4425; B29D 2030/4431; B29D 2030/4437; B29D 2030/4443; B29D 2030/445; B29D 2030/4456; B29D 2030/4462; B29D 2030/4468; B29D 2030/4475; B29D 2030/4481; B29D 2030/4487; B29D 2030/4493

See application file for complete search history.

(56) References Cited

U.S. PATENT DOCUMENTS

| | | | | |
|---|---|---|---|---|
| 2007/0289694 A1 | * | 12/2007 | Macheffe | ............... B29D 30/28 156/133 |
| 2009/0159579 A1 | | 6/2009 | Nishio | |

FOREIGN PATENT DOCUMENTS

| | | | | |
|---|---|---|---|---|
| GB | 1201240 | * | 8/1970 | ............. B29D 30/46 |
| JP | 04-283088 | * | 10/1992 | ............. B25J 15/06 |
| SU | 1072366 | * | 1/1992 | ............. B29D 30/30 |

OTHER PUBLICATIONS

Machine generated English language translation of JP 04-283088 (original document dated Aug. 1992).*

International Search Report for PCT/EP2013/076512 dated Mar. 18, 2014.

* cited by examiner

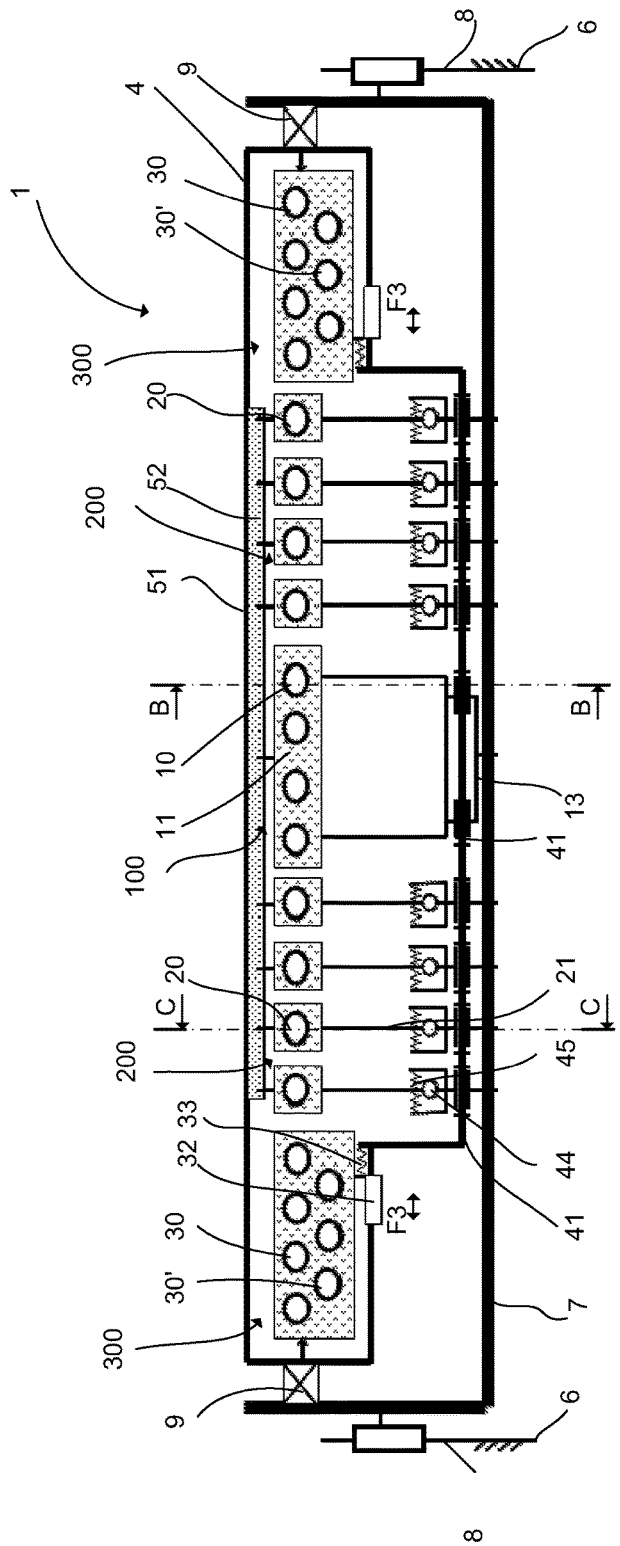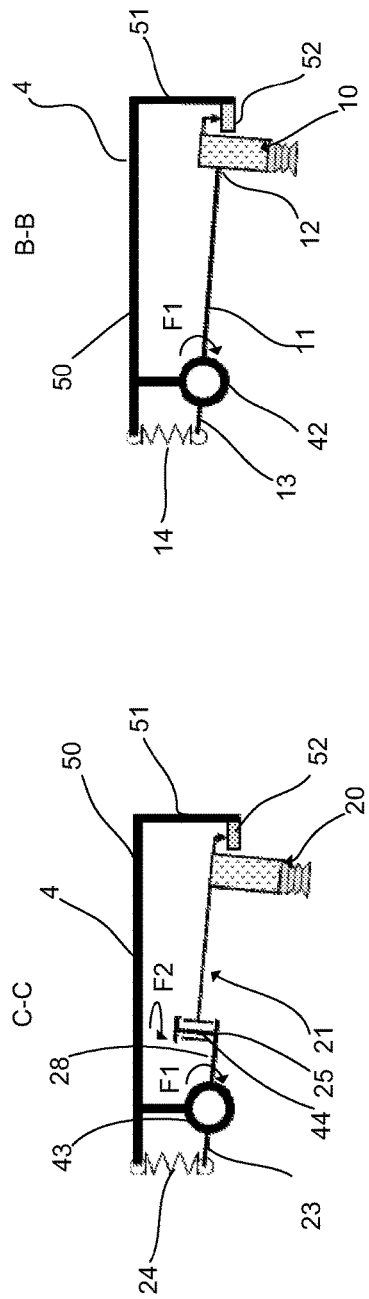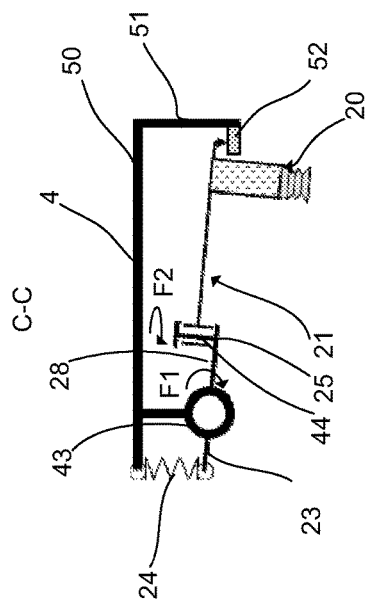

METHOD AND DEVICE FOR MANUFACTURING A GREEN TIRE

This application is a 371 national phase entry of PCT/EP2013/076512, filed 13 Dec. 2013, which claims benefit of French Patent Application No. 1261989, filed 13 Dec. 2012, the entire contents of which are incorporated herein by reference for all purposes.

BACKGROUND

1. Field

The present disclosure relates to the field of manufacturing tires, and more particular to tires referred to as self-supporting tires for passenger cars.

2. Description of Related Art

Tires referred to as self-supporting tires allow the vehicle to run at reduced pressure for a certain distance. These tires comprise reinforcements located in the sidewalls of the tire in order to make it possible to bear the load of the vehicle when the pressure decreases greatly. The sidewall reinforcements are in the form of rubber-based profiled elements having a high thickness compared with that of other profiled elements laid in this region.

Among the tires for passenger cars, tires having a radial carcass, commonly referred to as "radial tires", are known, these being preferred to tires referred to as "bias" tires by virtue of the qualities of endurance, comfort, lightness and low rolling resistance that are conferred by the radial technology. The radial tire consists essentially of flexible sidewalls and a more rigid crown, the sidewalls extending radially from the beads to the shoulders, the shoulders delimiting the crown between one another, the crown supporting the tread of the tire.

In a known manner, the method for manufacturing a green tire having a radial carcass consists in laying the various profiled elements of which the carcass of the green tire consists by winding them onto a rotary cylindrical drum, starting with the sealing rubber layer. In the case of self-supporting tires, the sidewall reinforcements are laid on the sealing rubber layer before the carcass reinforcement ply is laid, and then the method continues with the other profiled elements that are used in a conventional manner in radial tires. The carcass reinforcement ply is in the form of a portion of strip that consists, in a radial tire, of threads coated in a rubber compound. The threads, which are textile or metallic, are oriented axially or parallel to the longitudinal axis of the carcass (meaning that they are oriented perpendicularly to the direction of laying on the tire-building drum). During the assembly method, the ply is laid on the drum by a server, it is wound up on the drum and then its edges are butted together.

The document U.S. Pat. No. 5,953,377 describes a method and a device for joining, on a drum, the two ends of a rubber strip, in particular a tread having lateral edges that are thin in cross section. Such butting together is carried out by disposing suction cups at the centre and the two lateral edges of the strip and then applying a stretching force in the region of the thinner parts of the lateral edges at one of the ends of the strip. This force is applied to the suction cups in the longitudinal direction of the tread just before the two parts are butted together. This document does not relate to the assembly of the plies that form a carcass of a self-supporting tire having very thick rubber profiled elements within the carcass.

One problem which is associated with the assembly of tires referred to as self-supporting tires and which arises during the laying of the carcass reinforcement ply on very thick sidewall reinforcement profiled elements which have already been laid on the drum is the lack of adhesion of the reinforcement ply to these profiled elements, this being mainly due to the air which is trapped during assembly.

The document EP 1 625 931 provides a solution to this problem, which consists, firstly, in modifying the tire-building drum by providing circumferential grooves in the region for laying the sidewall reinforcements. However, this solution requires the use of specific drums for each type and size of tire and is not economically viable. Moreover, said document describes another solution which consists in covering the drum with a flexible coating made of a polyurethane foam. In this case, the use of a "standard" flexible coating is limited to the use of low-thickness sidewall reinforcements, the assembly of thicker reinforcements requiring that the flexible coating be changed in order to adapt the thickness of the lining to that of the reinforcements used. This requires additional handling operations when changing from one type of tire to another and penalizes productivity.

In order to alleviate these problems, the document EP 1 867 467 in the name of the applicant proposes a solution which consists in using a rotary cylindrical drum of the conventional type, on which a sealing rubber layer is laid, followed by the sidewall reinforcement profiled elements and to which the carcass reinforcement ply is subsequently attached, said carcass reinforcement ply, for its part, being delivered by a belt at a linear speed equal to the circumferential speed of the sealing rubber layer on the tire-building drum. The laying of the carcass reinforcement ply is followed by the passage of a deformable applicator roller which exerts a pressure at the points at which the reinforcement ply is brought into contact with the previously laid components. The front or rear edges of the carcass reinforcement ply are moreover grasped by a transporter having a number of suction cups disposed in a line, at a single height, the transporter being driven at the same linear speed as the belt so as to ensure the correct laying speed and to ensure that the threads of the carcass reinforcement ply are aligned. Although functioning satisfactorily, this method makes use of numerous devices, such as a ply server belt, a transporter, devices for regulating speed and finishing of laying, which require a large working space around the tire-building drum and also very fine adjustments in order to be able to synchronize them.

SUMMARY

An object of embodiments of the invention is to remedy the abovementioned drawbacks and to propose a method and a device for manufacturing a green tire of the self-supporting type that makes it possible to use a tire-building drum of which the surface for receiving the profiled elements is substantially cylindrical, and to significantly reduce the number of slaving devices of the drum and also the space necessary around the tire-building drum, while improving the quality of assembly.

This object is achieved by an embodiment of the invention, which proposes a method for manufacturing a green tire by winding a carcass reinforcement ply onto a cylindrical rotary tire-building drum having a circular section of which the generatrix is rectilinear and defines a first laying surface on which a number of profiled elements that are axially spaced apart one from one another and have a given thickness of which the meridian line has a curved profile and defines a second laying surface are laid, wherein: the front edge of the carcass reinforcement ply is grasped with the aid of a transport device having a chassis that supports a transverse row of ply gripping pads disposed in a line, in a manner parallel to said front edge, the carcass reinforcement ply is transferred, with the aid of said transport device, between a supply station and said drum, the front edge of said ply is laid on the tire-building drum, said transport device is withdrawn, an applicator roller having a deformable profile is applied to the front edge of said ply and a pressure is exerted in the radial direction across the width of said ply corresponding to the points at which the carcass reinforcement ply is brought into contact with said meridian line, and said drum is made to rotate. Said method is characterized in that at least one of the gripping pads is mounted in a movable manner with respect to the adjacent pads between a position in which all of the pads are located in a single plane and a second position in which at least said pad is vertically offset with respect to the adjacent pads so as to adapt the profile of said transverse row of pads to the curved profile of the meridian line of said second laying surface.

A curved profile is understood to be a non-rectilinear, preferably corrugated, profile. A gripping pad that is vertically movable with respect to the adjacent pads of a transverse row of pads is understood to mean that at least one pad (or group of pads when they are located at a single height) is movable perpendicularly to the longitudinal direction of the ply with respect to at least one of the neighbouring pads (or group of pads when they are located at a single height) such that the gripping ends of two pads (or groups of pads) disposed side-by-side are located at different altitudes. Thus, the distance between the gripping ends of the different pads of the transverse row is variable at the front edge of the carcass ply and corresponds to the curve of the meridian line of the drum. This distance is measured in a vertical plane, this plane being parallel to the radial direction passing through the plane tangent to the upper generatrix of the tire-building drum, this vertical plane also being perpendicular to the plane of the carcass reinforcement ply. The gripping pads are thus all located in a single plane when they come into contact with the ply on the storage table thereof, and then, on carrying along the ply, they become offset and impart a curved profile on the front edge of the ply just before it is laid on the tire-building drum.

A transverse row is understood to be a row which is parallel to the front edge of the ply and which is parallel to the longitudinal axis of rotation of the drum. This vertical mobility allows the gripping pads of the row to pass from a first position, in which the adjacent gripping pads are at a single height, in a single plane, to a second position, in which at least one gripping pad is vertically offset with respect to the adjacent pads or, conversely, to pass from a position in which one of the pads is offset with respect to the adjacent pads to a position in which the pads are at a smaller offset, or are vertically aligned. The vertically offset pad (or the pads when a number of pads are movable and adjustable vertically) is mounted in a movable manner on its support in the direction of the ply, perpendicularly to the longitudinal direction thereof, such that all the pads are located at the same height when they come into contact with the front edge thereof, and such that the offset is obtained by the vertical movement of the movable pad when the ply is lifted from its support. Thus, by moving one of the gripping pads of the row (or a group of pads secured to a common support) in the direction of the carcass reinforcement ply with respect to two adjacent pads, two vertical offsets are created, between the pad which has been moved and each of the pads adjacent thereto, this making it possible, when the front edge of the carcass reinforcement ply is grasped, to obtain two shapings or bulges of the ply. Thus, before the ply is laid on the tire-building drum, a reinforcement ply having a corrugated front edge is obtained. The corrugated front edge of the ply thus comprises shapings which are positioned above two axially spaced-apart profiled elements that have already been laid on the tire-building drum during the laying of the carcass ply on the tire-building drum.

The profile of the transverse row of gripping pads is adapted to the profile of the meridian line before each ply-laying operation if the profile of the meridian line changes from one laying operation to another or only once for a number of laying operations if the profile of the meridian line remains the same for all of these laying operations.

Thus, the laying of the carcass reinforcement ply is anticipated by shaping the front edge thereof with the aid of the transport device of which the gripping pads of the transverse row have been vertically adapted such that their ends follow the profile of the meridian line of the assembly already present on the drum. The profile of the front edge of the ply is thus adapted, prior to the laying operation, to that of the meridian line of the products already laid on the drum. The profile of the front edge of the ply adapted to that of the meridian line of the products already laid is understood as being a non-planar profile which at least partially follows the contour of said meridian line. Thus, by superposing the front edge of the carcass reinforcement ply thus profiled on the products already laid on the tire-building drum, good anchoring of the carcass reinforcement ply and thus good initiation of the assembly thereof before the drum is set in rotation is obtained.

It has been found, during laboratory tests, that by then applying a deformable applicator roller, with a pre-established pressure, starting from the correctly positioned anchoring points of the front edge of the carcass reinforcement ply on the products already laid on the drum, while simultaneously rotating the tire-building drum, the carcass reinforcement ply is made to adhere to the entire perimeter of the drum, without air inclusions being present between the plies. In addition, correct butting-together, within close tolerances, of the front and rear edges of the ply is obtained, and uniform coverage in the region of the weld, without indentation of the latter. It has also been found that the tension in the cords of the carcass ply is uniform around the entire circumference of the carcass and there is no air occlusion between the carcass reinforcement ply and the profiled elements or the inner rubber layer.

Preferably, the height of said gripping pads is adjusted such that they are arranged with increasing height from the centre and towards the ends of said row, as seen with respect to the plane of the carcass reinforcement ply. The height is measured between those ends of the gripping pads that come into contact with the ply and the chassis of the device. Thus, such an increasing height, as seen with respect to the tire-building drum or to the plane of the reinforcement ply, makes it possible to lay the carcass reinforcement ply starting from the centre of the drum and towards the ends thereof.

Advantageously, said device comprises first gripping pads arranged at the centre of the row and second gripping pads arranged on either side of the first gripping pads, the first and second gripping pads being movable in a substantially radial direction with respect to the tire-building drum. Pads that are movable in a radial direction with respect to the tire-building drum are understood as being able to move in a vertical plane which follows said radial direction when the transport device is located above the upper generatrix of the drum or in a vertical plane parallel to said vertical plane when the transport device is in some other location (or, when seen with respect to the plane of the reinforcing ply, this movement is perpendicular to the plane of the ply). A plurality of movable pads allows finer adjustment, to different heights thereof.

Preferably, said second gripping pads are movable in a substantially axial second direction with respect to the tire-building drum. An axial direction is understood as meaning a direction parallel to the generatrix of the drum or to the front edge of the carcass reinforcement ply (or in the transverse direction of the ply). Such axially movable pads make it possible to follow the shape of the protuberant profiled elements laid on the drum and to compensate for the flat loss of the front edge of the carcass reinforcement ply. Flat loss is understood as meaning the difference in length between the carcass reinforcement ply laid flat and the same ply laid on a non-planar generatrix, and takes into account the difference in length of the threads of the carcass reinforcement ply between the two positions thereof.

Advantageously, said device comprises third gripping pads adjacent to said second gripping pads which are movable in a substantially axial direction with respect to the tire-building drum. Like the previous pads, these third pads compensate for the flat loss of the carcass reinforcement ply, in particular during the anchoring of the regions of the ply that are contained between a profiled element and the lateral edge of the ply.

Preferably, said gripping pads are produced such that the plane of contact of their gripping ends is adaptable to the shape of the laying surface. Such gripping pads can thus have a flexible end, like flexible-bellows suction cups, or else have a rigid structure but be mounted on a ball joint. This allows finer adaptation of the gripping pad to a non-planar generatrix.

Advantageously, said gripping pads are mounted by means of elastic return means with respect to the chassis of the transport device.

Preferably, the profile of said transverse row is adapted with the aid of a profiled bar. This makes it possible to adjust all of the pads simultaneously, in a simplified manner.

Advantageously, said profiled bar is mounted on said chassis. This makes it possible to keep the gripping pads in the adjusting position. Advantageously, said bar is mounted so as to be removable with respect to the chassis in order to be able to adapt one and the same transport device to different profiled elements.

Advantageously, the applicator roller has a width in the axial direction substantially equal to the width of the carcass reinforcement ply. This makes it possible to apply a single pressure at the same time across the entire width of the ply.

Preferably, the applicator roller is a multi-disc roller. This makes it possible to ensure finer adaptation to the profile of the non-planar generatrix, with a uniform application of pressure at a number of points of contact.

The aim of embodiments of the invention is also achieved by way of a transport device for transporting a carcass reinforcement ply for a method for manufacturing a green tire by winding a carcass reinforcement ply onto a cylindrical rotary tire-building drum, said device comprising means for transferring the carcass reinforcement ply between a supply station and said drum, and also a chassis that supports a transverse row of gripping pads disposed in a line, in a manner parallel to said front edge of the carcass reinforcement ply. Said transport device is characterized in that at least one of the gripping pads is mounted in a movable manner with respect to the adjacent pads between a position in which all of the pads are located in a single plane and a second position in which at least said pad is vertically offset with respect to the adjacent pads so as to adapt the profile of said transverse row of pads to the curved profile of a meridian line that defines a laying surface on said drum.

Further advantageous features of the device are the subject of the secondary claims.

BRIEF DESCRIPTION OF DRAWINGS

The embodiments of the invention will be better understood by virtue of the rest of the description, which is based on the following figures:

FIG. 10 shows a schematic bottom view of the transport device of the invention;

FIG. 11 shows a sectional view taken on the plane B-B in FIG. 10;

FIG. 12 shows a sectional view taken on the plane C-C in FIG. 10.

Identical or similar elements bear the same references in the various figures. Therefore, their description will not be systematically repeated.

DETAILED DESCRIPTION OF SPECIFIC EMBODIMENTS

Figure 1:
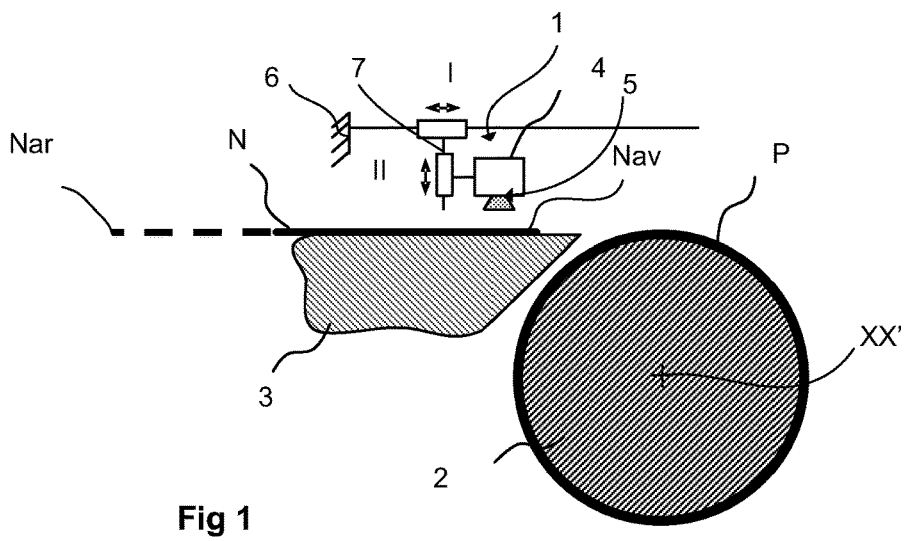
FIG. 1 shows a schematic view in cross section taken on a plane perpendicular to the longitudinal axis of the tire-building drum illustrating the transport device of an embodiment of the invention before the carcass reinforcement ply is grasped.
Figure 2:
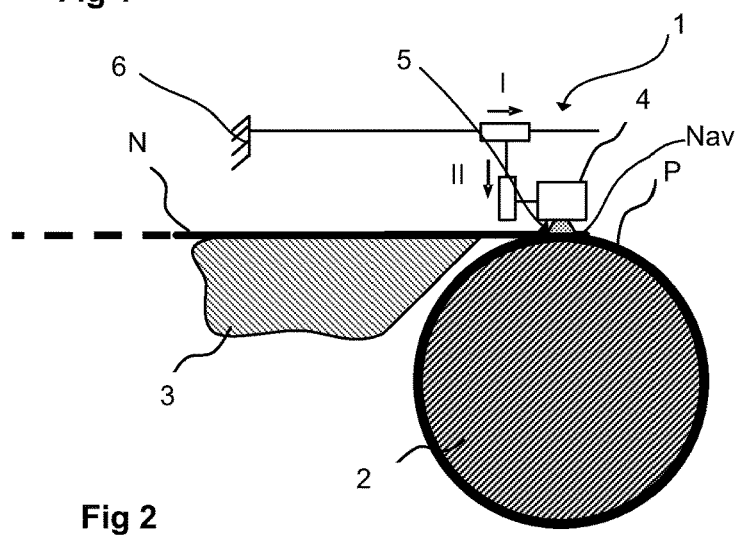
FIG. 2 shows a schematic view in cross section taken on the plane A-A in FIG. 9 illustrating the transport device of an embodiment of the invention while the front edge of the carcass ply is being laid on the tire-building drum.
Figures 7, 8, 9:
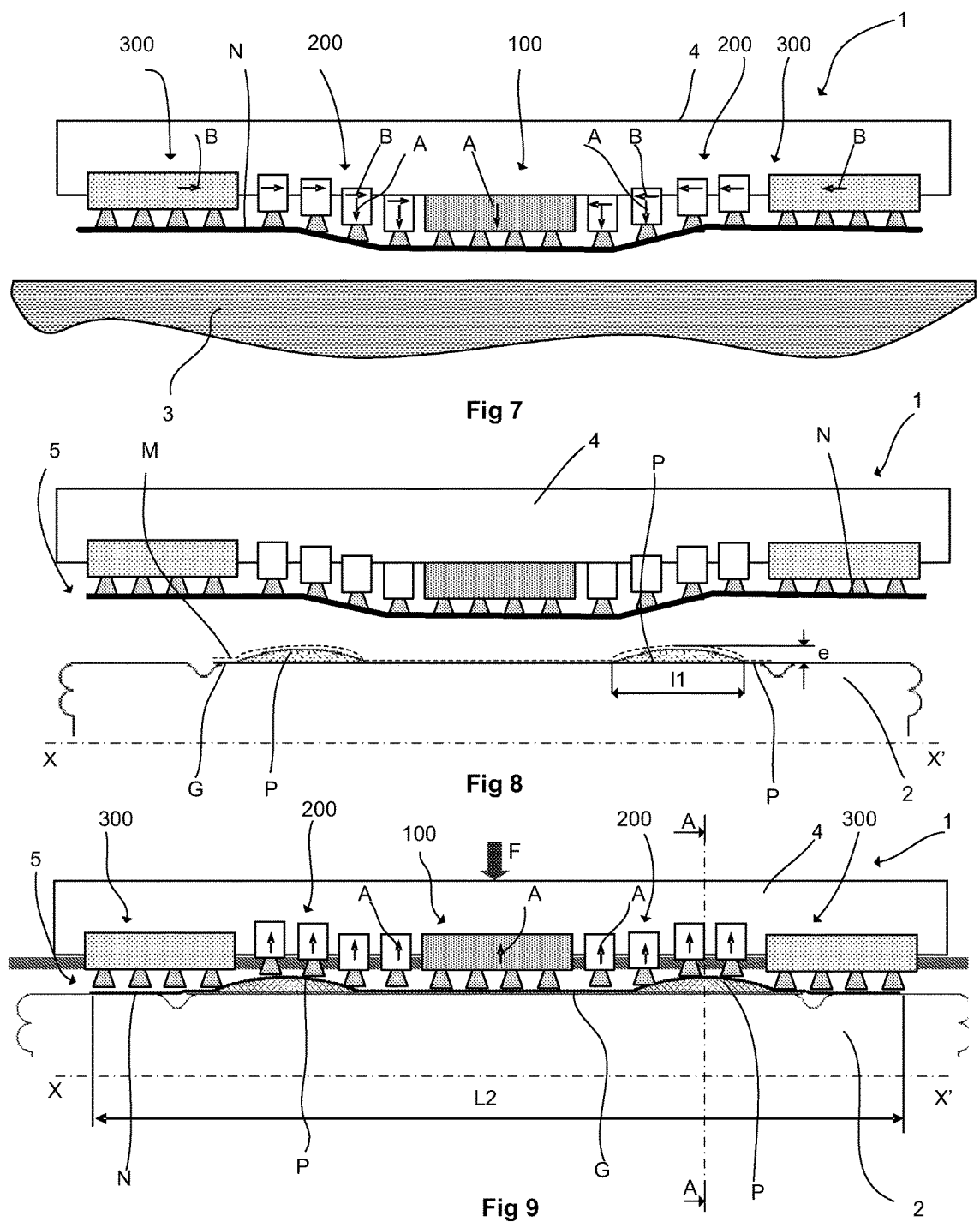
FIG. 7 shows a schematic view in longitudinal section of the transport device from FIG. 6 during the transfer of the carcass ply starting from the supply station.
FIG. 8 shows a schematic view in longitudinal section of the transport device from FIG. 7 when it is located at the tire-building drum.
FIG. 9 shows a schematic view in longitudinal section of the transport device from FIG. 8 illustrating the laying of the front edge of the carcass ply on the tire-building drum.

FIG. 1 shows a tire-building drum 2 having a cylindrical shape with a circular section of longitudinal axis XX'. The tire-building drum 2 has means for driving it in rotation about its longitudinal axis XX'. An inner sealing rubber layer G and profiled elements P of thickness e have been laid on this drum. FIG. 8 shows two sidewall reinforcement profiled elements that have been laid in a manner axially spaced apart from one another and the curved profile of the meridian line M (represented by a dotted line) of the assembly present on the drum prior to the laying of the carcass reinforcement layer N.

With reference to the appended figures, an assembly of a tire having a simple architecture formed from a sealing rubber layer G, two sidewall reinforcement profiled elements P and a carcass reinforcement ply N is described. It goes without saying that the method and the device of the invention can be applied equally well to tires having more complex architectures, comprising for example a number of carcass reinforcement plies and a number of sidewall reinforcement profiled elements.

In FIG. 1, the carcass reinforcement ply N disposed at a storage station which is represented by a laying table 3 having a horizontal flat surface for receiving a ply can be seen. A horizontal plane is understood to be a plane parallel to the plane tangent to the upper generatrix of the tire-building drum 2 and a vertical plane is understood to be a plane perpendicular to the horizontal plane and passing through the axis of the drum. A device for cutting the carcass reinforcement ply N (not shown in the drawings) is arranged close to the laying table 3 and longitudinally cuts the ply. In a variant, the storage station can be a roller on which the carcass reinforcement ply N is wound and which can be combined or not combined with a device for longitudinally cutting the ply. That part of the carcass reinforcement ply N that is located next to the tire-building drum, which is parallel to the generatrix of the latter, forms a front edge Nav above which a transport device 1 is placed.

The transport device 1 comprises a support frame 7 for a chassis 4 having a plurality of gripping pads for gripping the front edge Nav of the carcass reinforcement ply N, said pads forming a transverse row 5. The frame 7 is mounted with a possibility of moving in translation in the (longitudinal) direction I and the chassis 4 is mounted with a possibility of moving in translation in the (vertical) direction II with respect to a fixed base 6. The movement in translation in the direction I allows the transport device 1 to move back and forth between the laying table 3 and the tire-building drum 2 and is effected with the aid of an electric motor or a pneumatic actuator (these not being shown) which moves the frame 7 on horizontal rails 8. The movement in translation in the second direction II allows the transport device 1 to move up and down with respect to the laying table 3 or the tire-building drum 2 and is carried out with the aid of an electric motor or a pneumatic actuator (these not being shown) which moves the chassis 4 on vertical rails 9. The movement in translation in the second direction II allows the transport device 1 to move between a first, rest position, and a second, active position in which it grasps the carcass reinforcement ply on the laying table 3.

The gripping pads are disposed in a line and form a transverse row 5 which is parallel to the front edge Nav of the carcass reinforcement ply. The gripping pads are disposed side-by-side in the transverse direction of the carcass reinforcement ply N, substantially across the entire width thereof. A transverse direction is understood to be a direction parallel to the front edge of the carcass ply and to the longitudinal axis XX' of the tire-building drum 2. The width of the carcass reinforcement ply is understood to be its dimension measured in the transverse direction, between the two lateral edges of the ply, and the length is understood to be the dimension measured in the longitudinal direction, between the front edge Nav and the rear edge Nar.

In the example shown in the figures, the chassis 4 supports the transverse row 5 of gripping pads which are mounted in a movable manner with respect to the chassis. In a variant, the gripping pads are movable independently with respect to one another and with respect to the chassis 4. However, for reasons of structural simplicity, it is preferred for some pads to be mounted on a common movable support. The gripping pads may be vacuum strips or magnets that are each mounted on a ball joint, or else flexible-bellows suction cups. In the example shown in the figures, the gripping pads are flexible-bellows suction cups that are connected to vacuum sources. The flexible-bellows suction cups are preferred by virtue of the flexibility of adapting the gripping end to a shape in relief, in particular owing to the capacity of the flexible bellows to deform about the longitudinal axis of the suction cup.

According to an embodiment of the invention, at least one of the gripping pads is vertically movable with respect to the adjacent pads so as to adapt the profile of said row to the profile of the meridian line M before the front edge Nav of the carcass reinforcement ply N is grasped. In the example shown in the figures, a number of gripping pads are vertically adjustable to a given profile and all of the gripping pads are movable, thereby making it possible to obtain even more faithful adaptation of the profile of the row to that of the meridian line M. The possibilities for these pads or suction cups to move allow the profile of their gripping ends to be made to match the profile of the meridian line M before the front edge Nav of the carcass reinforcement ply N is grasped.

Figure 4:
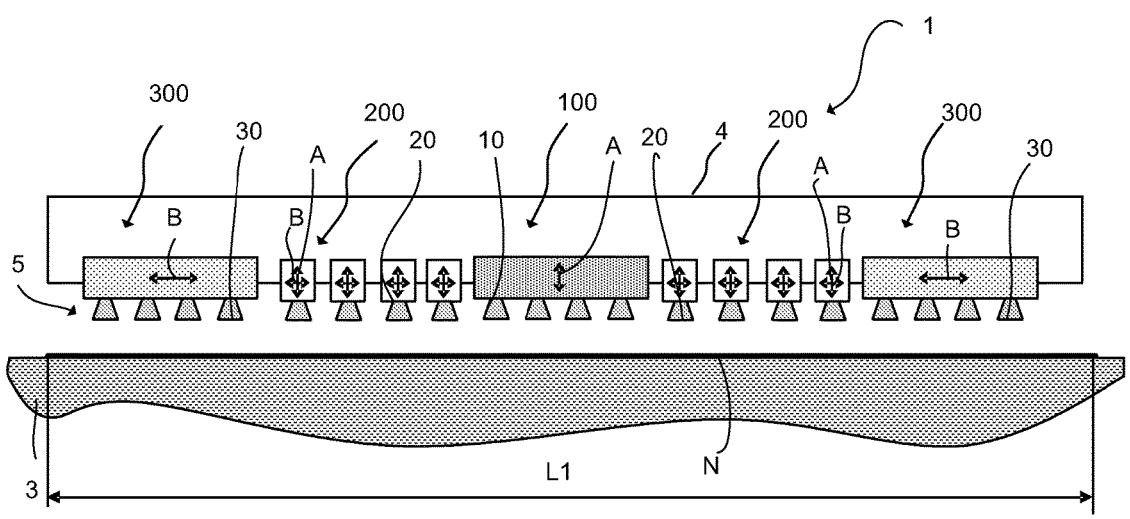
FIG. 4 shows a schematic view in longitudinal section of the transport device of an embodiment of the invention in the rest position, following the adjustment of the gripping devices with a view to laying the carcass reinforcement ply on a tire-building drum having a planar generatrix.

As can be seen more clearly in FIG. 4, the transport device 1 comprises first gripping pads 100, comprising a number of central suction cups 10, which are movable in a substantially radial direction with respect to the tire-building drum, this direction being substantially perpendicular to the plane of the carcass reinforcement ply N, in the direction of the arrows A in FIG. 4. The central suction cups 10 are arranged in the central region of the chassis 4.

The transport device 1 also comprises second gripping pads 200 that are arranged on either side of the first gripping pads 100 and comprise intermediate suction cups 20. The second gripping pads 200 are movable in a first, substantially radial direction with respect to the tire-building drum 2, this direction being substantially perpendicular to the plane of the carcass reinforcement ply N, in the direction of the arrows A, and also in a second, substantially axial direction with respect to the drum (or in a direction transverse to the ply), in the direction of the arrows B in FIG. 4.

The device moreover comprises third gripping pads 300 that are disposed adjacent to the second gripping pads 200, being arranged towards the ends of the row and thus of the chassis 4 of the device. The third gripping pads 300 comprise lateral suction cups 30 and are movable in a substantially axial direction with respect to the tire-building drum 2 (or in a direction transverse to the carcass reinforcement ply N), in the direction of the arrows B in FIG. 4.

An exemplary embodiment of the transport device 1 of the invention is more clearly visible in FIG. 10. It comprises a frame 7 which has an overall U shape and supports the chassis 4 in its interior. The chassis 4 is a part having a parallelepipedal overall shape that is downwardly open in the direction of the tire-building drum, the upper wall 50 of which supports the gripping pads and the front wall 51 of which supports a profiled bar 52. The profiled bar 52 has a transverse profile close to the contour of the meridian line M. It is preferably mounted in a removable manner on the inner part of the front wall 51, such that the transport device 1 can be adapted to different shapes and dimensions of green tires.

In the example shown in FIG. 10, the first gripping pads 100, having five central suction cups 10 arranged on a common frame 11, are arranged at the centre of the chassis 4. The frame 11 has a rectangular overall shape, and it has a front transverse side 12 supporting a row of five central suction cups 10 and a rear transverse side 13 which is mounted in a rotary manner (along the arrow F1) about a transverse spindle 41 of the chassis 4 by means of a pivoting articulation 42. The support 11 is connected at its rear end to the chassis 4 by a tension spring 14 (FIG. 11). The front transverse side 11 has a length that is comparable to, preferably slightly less than, the distance between the profiled elements P, the number of central suction cups 10 being chosen depending on this distance. The central suction cups 10 are all connected to a vacuum source (not shown in the drawings).

The intermediate suction cups 20 of the second gripping pads 200 are arranged on either side of the frame 11 supporting the central suction cups 10 of the first gripping pads 100. In the example illustrated in FIGS. 9 to 11, four intermediate suction cups 20 are arranged on each side of the frame 11. Each intermediate suction cup 20 is mounted at the end of an articulated arm 21. Each articulated arm 21 has an elongate overall shape having an intermediate suction cup 20 mounted at its front end 22, while the rear end 23 has a double pivoting articulation. As is more clearly visible in FIG. 12, the articulated arm 21 is mounted in a rotary manner about the transverse spindle 41 (along the arrow F1), by means of a first pivoting articulation 43, and about a substantially vertical spindle 25, substantially perpendicular to the first spindle, by means of a second pivoting articulation 44 (along the arrow F2). The rear end 23 is connected to the chassis 4 by a tension spring 24 and to the pivoting articulation 44 by a rod 28. Pivoting about the spindle 25 takes place under the pushing force of a spring 45. The number of intermediate suction cups 20 is chosen depending on the dimensions, in particular thickness "e" and width "l" of the profiled elements P. Each intermediate suction cup 20 is connected to a vacuum source (not shown in the drawings).

As is more clearly visible in FIG. 10, the third gripping pads 300 have a number of lateral suction cups 30 arranged on a common lateral support 31 that is mounted in a laterally movable manner with respect to the chassis 4. The lateral support 31 is mounted so as to slide axially with respect to the tire-building drum (or transversely with respect to the carcass reinforcement ply) on a slideway 32 under the pushing force of a compression spring 33 (in the direction indicated by the arrow F3). The lateral suction cups 30 are aligned transversely with the intermediate suction cups 20 and with the central suction cups 10, the number of said lateral suction cups 30 being chosen depending on the width of the carcass ply N beyond the profiled elements P. Advantageously, a second row of lateral suction cups 30' is arranged parallel to the previous row on the same common lateral support 31, the suction cups 30' being arranged in a staggered manner with respect to the suction cups 30. This allows improved holding of the carcass reinforcement ply N and finer adjustment of the forward movement of the transport device 1. The lateral suction cups 10 of each common lateral support 31 are all connected to a vacuum source (not shown in the drawings).

By way of example, the flexible-bellows suction cups of which the transport device 1 is made up are arranged at a substantially equal distance from one another, they have a diameter of around 20 mm, and the centre-to-centre spacing between two adjacent suction cups is 30 mm.

Figure 5:
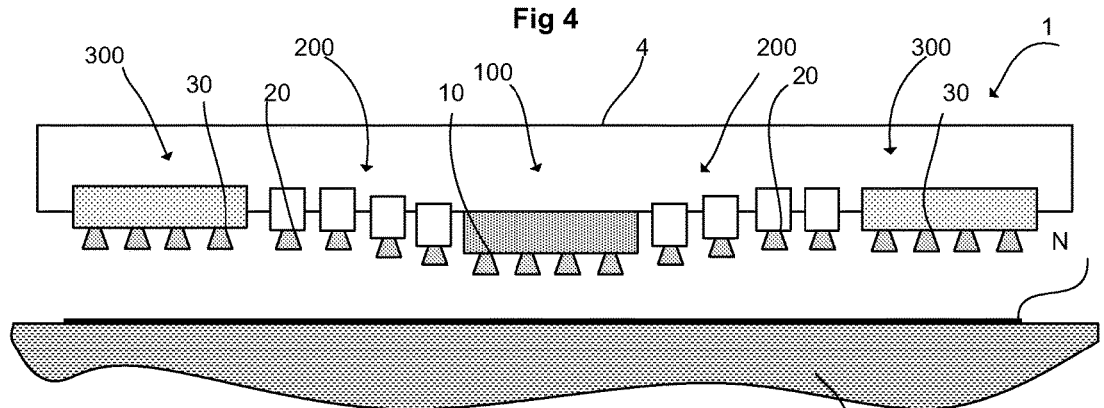
FIG. 5 shows a schematic view in longitudinal section of the transport device of an embodiment of the invention in the rest position following the adjustment of the gripping devices with a view to laying the carcass reinforcement ply on a tire-building drum having a non-planar generatrix.

In operation, before grasping the carcass reinforcement ply N on the laying table 3, the transport device 1 undergoes an operation of adaptation of the gripping profile, which is an imaginary contour passing through the gripping ends of the suction cups of the transverse row 5, to the contour of the meridian line M. Thus, the transverse row 5 of the transport device 1 passes from an initial position, in which the central suction cups 10 and intermediate suction cups 20 are driven constantly downwards by the springs 14 and 24, to a position referred to as a profiled position thereof (FIG. 5) bearing against the profiled bar 52. The profiled bar 52 is used as a mechanical stop for the supports of the central suction cups 10 and intermediate suction cups 20 which are radially movable with respect to the tire-building drum 2 or perpendicularly to the plane and to the longitudinal direction of the carcass ply. For this purpose, the profile of the profiled bar 52, as seen starting from the centre of the meridian line M, is similar to that of the meridian line M as far as the level of the tops S of the profiled elements P, and then it continues along the tangent to the top S on either side of the profiled elements P. During the operation of adaptation of the profile of the device to that of the profiled bar 52, the support 11 and the articulated arms 21 pivot about their articulations 42 and 43 so as to bear with their front ends against the profiled bar 52 (FIGS. 11 and 12). In the absence of the profiled bar 52, the support 11 and the articulated arms 21 are driven downwards under the action of the springs 14 and 24.

Figure 6:
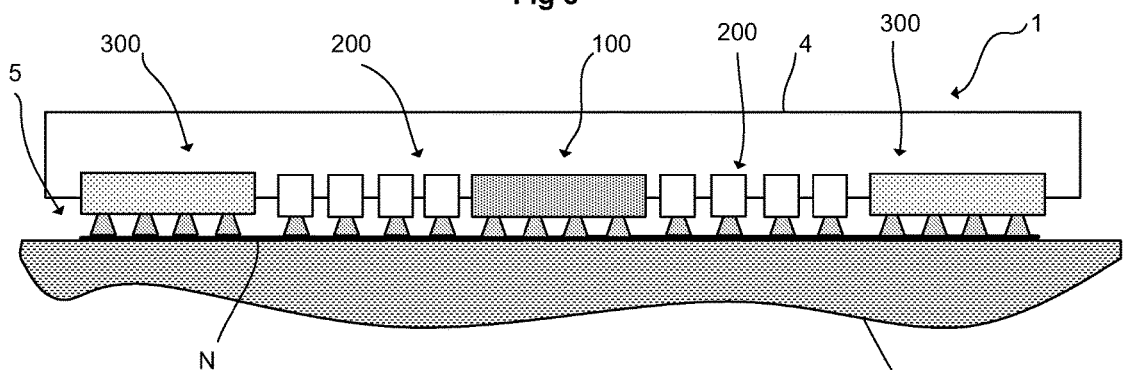
FIG. 6 shows a schematic view in longitudinal section of the transport device from FIG. 5 coming into engagement with the carcass ply.

FIG. 6 illustrates the transport device 1 in the course of grasping the carcass reinforcement ply N on the laying table 3. The movement of the transport device 1 in the longitudinal direction I was commanded beforehand such that the device arrives in a position located above the front edge Nav, in the position illustrated in FIG. 1. Next, the device carries out a vertical downward movement in the direction II until all of the suction cups, including the lateral suction cups 30, touch the front edge Nav of the carcass ply N, the intermediate suction cups 20 and the central suction cups 10 moving counter to the force of their respective springs, and being positioned at the same level (in the same plane) as the lateral suction cup 30, in contact with the front edge Nav of the carcass reinforcement ply N. Next, the suction cups are put under negative pressure and a vertical upward movement is imparted on the chassis 4 in the direction II. The transport device 1 rises and lifts the carcass reinforcement ply N from the laying table 3. On rising, the intermediate suction cups 20 and the central suction cups 10 return to their initial position under the action of their respective springs (along the arrows A), having the result of imparting a profile on the front edge Nav of the carcass reinforcement ply N (FIG. 7). During this phase of returning to the initial position or rest position of the intermediate suction cups 20 and central suction cups 10, the front edge Nav of the carcass reinforcement ply N undergoes a first shaping on a protuberance (or flat loss) which is taken into account by the axial movement (along the arrows B) of the intermediate suction cups 20 and lateral suction cups 30.

The transport device 1 then moves horizontally, in the direction I, from the laying table 3 until the front edge Nav is located above the generatrix of the tire-building drum 2 (FIG. 8). The transport device 1 moves radially in the direction of the drum in order to apply the carcass reinforcement ply N thereto (along the arrow F in FIG. 8). During this downward phase of the device, in view of the progressive arrangement with increasing height of the gripping ends of the suction cups starting from the centre of the device, the carcass reinforcement ply N is applied to the drum by successively laying the portion of ply located in the centre, and then progressively the portions located axially towards the two ends of the ply. This mode of operation has the advantage of allowing better evacuation of the air contained between the carcass reinforcement ply N and the profiled elements P, while ensuring progressive flat loss of the carcass reinforcement ply N until it reaches its length L2 (FIG. 9). The difference between the initial length L1 of the ply N and its final length L2 is referred to as flat loss. This has the result of good anchoring of the front edge Nav on the generatrix of the tire-building drum 2 (FIG. 9). The suction cups are then deactivated and the transport device 1 rises radially and moves longitudinally in the direction of the laying table 3 and waits to grasp a new carcass reinforcement ply N.

Figure 3:
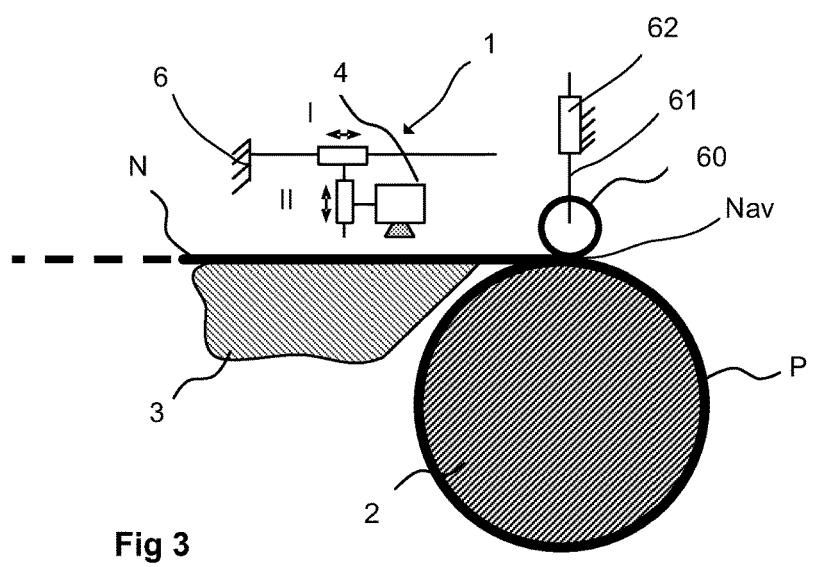
FIG. 3 shows a schematic view in cross section taken on a plane perpendicular to the longitudinal axis of the tire-building drum illustrating the transport device of an embodiment of the invention while the carcass reinforcement ply is being laid on the tire-building drum.

FIG. 3 illustrates the final step in the method, which consists in applying a deformable applicator roller 60 to the carcass reinforcement ply N at the same time as the tire-building drum 2 is set in rotation. The ply is located on the laying table and is carried along by the rotation of the drum, a cutting device cutting it lengthwise towards the end of winding. A chassis 61 which supports the deformable applicator roller 60 in the radial direction is brought into contact with the front edge Nav of the carcass reinforcement ply by way of an applicator actuator 62, and the tire-building drum 2 is set in rotation. The deformable applicator roller 60 of the example shown is a commonly used roller of the type having an assembly of several discs arranged side-by-side that are radially movable with respect to one another. A pneumatic device forces each of the discs to move in the radial direction until the disc comes into contact with the laying profile. The width of the deformable applicator roller 60 corresponds substantially to the width L2 of the carcass reinforcement ply N, meaning that the points at which the deformable applicator roller makes contact are distributed across the entire width of the ply and allow the latter to be applied correctly to the tire-building drum 2. In a variant embodiment of the invention, a foam applicator roller is used instead of the multi-disc roller above, in particular for profiled elements P having a smaller thickness, for example less than 6 mm.

Laboratory tests were carried out with the device of the invention by laying the carcass reinforcement ply N on profiled elements having different thicknesses "e" that were applied to a first inner rubber layer G. Very good results in terms of uniformity of the cords of the carcass reinforcement ply N on the circumference of the carcass, good adhesion, without air inclusions, between the carcass reinforcement ply N and the inner rubber G and between the ply and the profiled elements P, along the entire length of the meridian line M. Good results in terms of weld adhesion of the edges of the carcass ply, with uniform covering of the weld were obtained with the profiled elements having a thickness less than or equal to 15 mm.

Further variants and embodiments of the invention can be envisaged without departing from the scope of the claims. Thus, the suction cups of the transport device can be set in motion by any other mechanism, for example using slideways and guide rails instead of the pivoting articulations, while respecting the dynamics described.

Moreover, since the vertical adjustment of the suction cups to the transport device can be carried out easily with the aid of a removable profiled bar, the transport device of the invention can be used to grasp and lay a carcass reinforcement ply both to a profiled generatrix and to a planar generatrix, in the latter case all of the suction cups being adjusted to a single height before the ply is grasped using a profiled bar having a rectilinear profile.

The invention claimed is:

1. A method for manufacturing a green tire by winding a carcass reinforcement ply (N) onto a cylindrical rotary tire-building drum having a circular section of which the generatrix is rectilinear, on which an inner rubber layer (G) is laid and defines a first laying surface, on which a number of profiled elements (P) that are axially spaced, with respect to a rotation axis of said tire-building drum, apart one from one another and have a given thickness are laid, wherein said inner rubber layer (G) and said profiled elements (P) define a second laying surface that defines a meridian line (M) having a curved profile on which said carcass reinforcement ply (N) is wound, comprising:

grasping a front edge (Nav) of the carcass reinforcement ply (N) with the aid of a transport device having a chassis that supports a transverse row of gripping pads disposed along a line parallel to said front edge, transferring the carcass reinforcement ply (N), with the aid of said transport device, between a supply station and said tire-building drum, laying the front edge (Nav) of said ply on the second laying surface, withdrawing said transport device, applying an applicator roller having a deformable profile to the front edge (Nav) of said carcass reinforcement ply, and exerting a pressure in the radial direction, with respect to the tire-building drum, across the width of said carcass reinforcement ply corresponding to the points at which the carcass reinforcement ply is brought into contact with said second laying surface, and rotating said tire-building drum, wherein after the step of grasping the front edge (Nav) of the carcass reinforcement ply (N) and prior to the step of laying the front edge (Nav) of the carcass reinforcement ply (N) on the second laying surface, moving at least one of the gripping pads relative to at least one other of the gripping pads such that the transverse row of gripping pads is adjusted from a first configuration in which all of the gripping pads are located in a single plane while grasping the front edge (Nav) of the carcass reinforcement ply (N) to a second configuration in which said at least one gripping pad is vertically offset with respect to said at least one other gripping pad so as to impart in said carcass reinforcement ply (N) a non-planar profile which follows the contour of the meridian line (M) by displacing an articulating support carrying the at least one of the gripping pads into contact with a profiled bar that has a profile corresponding to that of the meridian line to as to impart the row of gripping pads with the second configuration.

2. The method according to claim 1, further comprising adjusting the height of said gripping pads such that they are arranged with increasing vertical height, with respect to the carcass reinforcement ply (N), from the center of said transverse row outwardly towards the ends of said transverse row.

3. The method according to claim 1, wherein said transport device comprises first gripping pads arranged at the center of said row and second gripping pads arranged on either side of the first gripping pads, the first and second gripping pads being movable in a substantially radial direction with respect to the tire-building drum.

4. The method according to claim 3, wherein said second gripping pads are movable in a substantially axial second direction with respect to the tire-building drum.

5. The method according to claim 3, wherein said device comprises third gripping pads disposed on opposite sides of said second gripping pads in said transverse row of gripping pads, said third gripping pads being movable in a substantially axial direction with respect to the tire-building drum.

6. The method according to claim 1, wherein said gripping pads have gripping ends that are, together, adapted to form a gripping profile prior to the front edge (Nav) of the carcass reinforcement ply (N) making contact with said second laying surface.

7. The method according to claim 1, wherein said gripping pads are mounted by means of elastic return means with respect to the chassis.

8. The method according to claim 1, wherein the applicator roller has a width in the axial direction substantially equal to the width of the carcass reinforcement ply.

* * * * *